United States Patent
Mori et al.

(10) Patent No.: US 7,221,492 B2
(45) Date of Patent: May 22, 2007

(54) SCANNING DEVICE INCLUDING AN OBJECTIVE SYSTEM WITH A LENS PROTECTION DEVICE

(75) Inventors: Nobuyoshi Mori, Hachioji (JP); Katsuya Yagi, Hachioji (JP); Bernardus Hendrikus Wilhelmus Hendriks, Eindhoven (NL); Johannes Joseph Hubertina Barbara Schleipen, Eindhoven (NL); Marco Andreas Jacobus Van As, Eindhoven (NL)

(73) Assignee: Koninklijke Philips Electronics N. V., Eindhoven (NL)

( * ) Notice: Subject to any disclaimer, the term of this patent is extended or adjusted under 35 U.S.C. 154(b) by 277 days.

(21) Appl. No.: 10/523,384

(22) PCT Filed: Aug. 4, 2003

(86) PCT No.: PCT/IB03/03419

§ 371 (c)(1),
(2), (4) Date: Feb. 1, 2005

(87) PCT Pub. No.: WO2004/015694

PCT Pub. Date: Feb. 19, 2004

(65) Prior Publication Data

US 2005/0275917 A1    Dec. 15, 2005

(30) Foreign Application Priority Data

Aug. 5, 2002    (EP) ................... 02078216

(51) Int. Cl.
G02B 26/08    (2006.01)

(52) U.S. Cl. .................. 359/205; 369/112.23

(58) Field of Classification Search ................ 359/205, 359/900; 369/112.23
See application file for complete search history.

(56) References Cited

U.S. PATENT DOCUMENTS 6,930,973 B2 *    8/2005    Hendriks et al. ...... 369/112.06

FOREIGN PATENT DOCUMENTS

EP    1081692 A2    3/2001
EP    1081692 A3    12/2002

OTHER PUBLICATIONS

M. Itonga, et.al. Single Objective Lens Having Numerical Aperture of 0.85 for a High Density Optical Disk System; Mar. 2002; vol. 41 pp. 1798-1803; part 1; No. 3B.

* cited by examiner

Primary Examiner—Euncha P. Cherry

(57) ABSTRACT

An optical scanning device (1) for scanning an information layer (4) of an optical record carrier (2), the device (1) comprising a radiation source (11) for generating a radiation beam (12, 15, 20) and an objective system (18) for converging the radiation beam on the information layer, the information layer being covered by a transparent layer (3) of thickness td and refractive index nd. The objective system comprises a lens having a protection device projecting away from the lens towards the optical record carrier such that the distance between the protection device and the optical record carrier is less than the free working distance. The lens satisfies the condition: where D is the entrance pupil diameter, FWD is the free working distance, and D, FWD, t and td are all expressed in millimeters and where FWD+td/nd<0.51.

11 Claims, 4 Drawing Sheets

SCANNING DEVICE INCLUDING AN OBJECTIVE SYSTEM WITH A LENS PROTECTION DEVICE

The present invention relates to an optical scanning device for scanning an optical record carrier, to a lens system suitable for, but not limited to, use as an objective lens in such a scanning device, and to methods for manufacturing such a device and such a system.

In optical recording, increasingly the trend is towards miniaturization of both the optical record carriers and the devices used to scan (e.g. write to and/or read from) the carriers. Examples of optical record carriers include CDs (compact discs) and DVDs (digital versatile discs).

In order for the optical record carriers to be made smaller, without a decrease in information storage capacity, the information density on the carrier must be increased. Such an increase in information density must be accompanied by a smaller radiation spot for scanning the information. Such a smaller spot can be realized by increasing the numerical aperture (NA) of the objective system used for focusing a radiation beam in the scanning device on the record carrier. Consequently, it is desirable to have a lens with a high numerical aperture (e.g. NA=0.85).

Conventional high NA objective lenses consist of two elements in order to ease the manufacturing tolerances, at the expense of introducing an extra assembly step to align the elements making up the objective lens.

The Japanese article "Single Objective Lens Having Numerical Aperture 0.85 for a High Density Optical Disk System" by M Itonga, F Ito, K Matsuzaki, S Chaen, K Oishi, T Ueno and A Nishizawa, Jpn. J. Appl. Phys. Vol. 41 (2002) pp. 1798–1803 Part 1, No. 3B March 2002, describes a single objective lens, having two aspherical surfaces, with a relatively high NA of 0.85. The lens is made of glass. The lens diameter is 4.5 mm, and the lens has an aperture diameter of 3.886 mm. This single element lens does not require the alignment assembly step needed by the two-element objective lens. Because of the high value of NA, the objective lens becomes more susceptible to variations in the manufacturing process i.e. manufacturing tolerances. Therefore, for these high NA objective lenses the manufacturing tolerances play an even more important role in the designing process than was the case for objective lenses having a lower numerical aperture.

In order for scanning devices to decrease in size, it is desirable that the components within the scanning devices (such as the objective lens) are made as small as possible.

However, it is not possible to simply scale down large lens designs to produce smaller lenses, as the lens design is dependent upon the properties of the optical recording medium. For instance, the lens design is dependent upon the properties of the transparent layer that typically covers the information layer on an optical record carrier, and which the scanning radiation beam must traverse. In the scaling down process the thickness of the cover layer of the disc remains unaffected (the same record carrier is likely to be used for both the normal sized objective lens and the small sized objective lens). Hence, the design of a small sized objective lens suitable for scanning the optical record medium will be substantially different from the design of a normal sized objective lens.

It will also be appreciated that as lenses are made smaller, the high NA objective lenses remain susceptible to variations in the manufacturing process i.e. manufacturing tolerances.

FIG. 1A shows an example of an objective lens 18, having two aspherical surfaces 181, 182 and of thickness t (the lens thickness along the optical axis 19). Subsequent FIGS. 1B, 1C and 1D respectively illustrate how the lens shape will vary due to variations in thickness, decentre and tilt of the two aspherical surfaces (in each instance, the original position of the surface 181 is illustrated by a dotted line). In these Figures, it is assumed that only the surface 181 has been affected by the variations in the manufacturing process. However, it will be appreciated that in actual fact either or both of the surfaces can be affected, and that either surface could be affected by two or more of these deviations simultaneously.

Figure 1A:
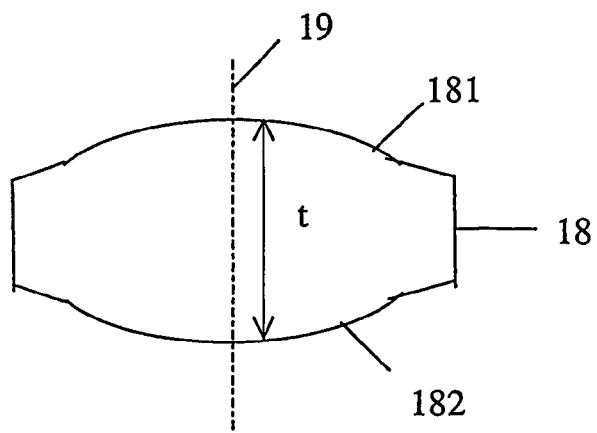
FIG. 1B illustrates the thickness of the lens being greater than the desired thickness t, due to the spacing in between the aspherical surfaces being larger than desired. However, it will be appreciated that the two aspherical surfaces could in fact be spaced closer together than desired as well.
FIG. 1C illustrates decentre i.e. in this example, how surface 181 has been formed shifted in a direction perpendicular to the ideal position relative to the desired optical axis 19.
FIG. 1D illustrates how surface 181 is tilted i.e. rotated in relation to the desired rotationally symmetric position along the principal axis.
Figure 1B:
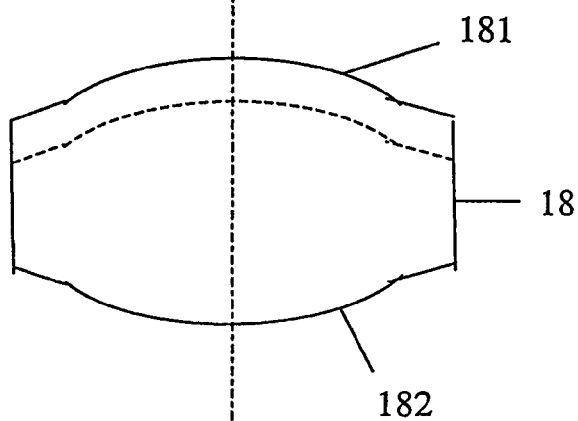
Figure 1C:
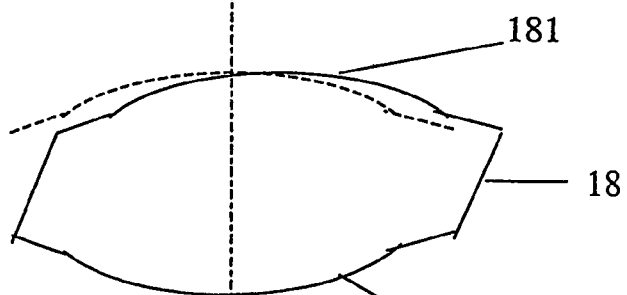
Figure 1D:
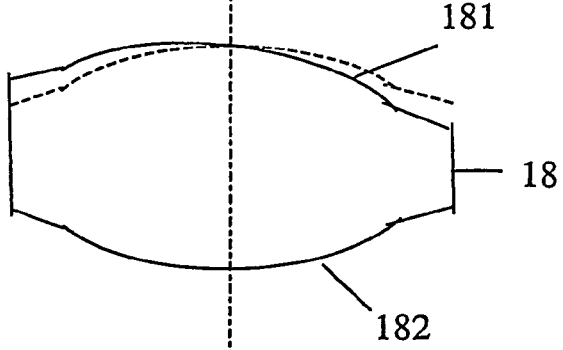

It is an aim of embodiments of the present invention to provide an objective lens capable of withstanding reasonable manufacturing tolerances.

In optical scanning devices, radiation beams may enter the objective lens obliquely, due to inaccurate alignment of the objective lens within the scanning device, variations in the position of the recording carrier relative to the scanning device, or due to radiation beams being utilized that do not travel along the optical axis. For instance, such off-axis beams are typically used to provide information on positioning of the scanning radiation spot on the record carrier.

Such oblique beam entrance results in wave-front aberrations. Typically an allowance in the root mean square of the optical path difference ($OPD_{rms}$) of approximately $0.07\lambda$ (where $\lambda$ is the wave length of the relevant radiation beam), in total is allowed for wave-front aberrations of the scanning beam for the total optical scanning device, such that the system is diffraction limited. It can be convenient to express the $OPD_{rms}$ in $m\lambda$ (where $0.001\lambda = 1\ m\lambda$). The field of the lens system is the area within which oblique beams generate an $OPD_{rms}$ of less than $15\ m\lambda$. The field of view of the lens system is twice the field.

In use in an optical scanning device, the lens is typically positioned relatively close to the surface of the optical record carrier. If the unit containing the scanning device is knocked or dropped by a user, then the surface of the lens closest to the optical record carrier may come into contact with the optical record carrier surface. This could potentially result in damage of the lens surface.

It is known for large sized two element objective glass lenses to incorporate a "bumper", a ring of plastic glued to the lens surface adjacent the record carrier. Such a bumper acts to prevent the lens surface contacting the record carrier. However, producing a lens with such a bumper requires various additional manufacturing steps to form, locate and attach the bumper.

It is an aim of the embodiments of the present invention provide an objective lens (and preferably a small sized high NA objective lens) that is tolerant to oblique beam entrance to the lens, tolerant of manufacturing errors, and has a device suitable for stopping the optical surface of the lens touching the surface of a record carrier when in use in an optical scanning device. Preferably, such a device can easily be positioned on the lens.

In a first aspect, the present invention provides an optical scanning device for scanning an information layer of an optical record carrier, the device comprising a radiation source for generating a radiation beam and an objective system for converging the radiation beam on the information layer, the information layer being covered by a transparent layer of thickness $t_d$ and refractive index $n_d$, the objective system being characterized in comprising a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where D is the entrance pupil diameter, FWD is the free working distance, and D, FWD, t and $t_d$ are expressed in millimeters and where $FWD + t_d/n_d < 0.51$.

By designing a lens to satisfy such constraints, the resulting lens is tolerant to oblique beam entrance and manufacturing errors, and the lens is prevented from touching the surface of a record carrier when in use.

In another aspect, the present invention provides a lens system comprising at least one lens for converging a radiation beam on an information layer of an optical record carrier, the information layer being covered by a transparent layer of thickness $t_d$ and refractive index $n_d$, the lens system being characterized in comprising a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where D is the entrance pupil diameter, FWD is the free working distance, and D, FWD, t and $t_d$ are expressed in millimeters and where $FWD + t_d/n_d < 0.51$.

In a further aspect, the present invention provides a method for manufacturing a lens system comprising at least one lens for converging a radiation beam on an information layer of an optical record carrier, the information layer being covered by a transparent layer of thickness $t_d$ and refractive index $n_d$, the method comprising the step of: forming a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where D is the entrance pupil diameter, FWD is the free working distance, and D, FWD, t and $t_d$ are expressed in millimeters and where $FWD + t_d/n_d < 0.51$.

In another aspect, the present invention provides a method of manufacturing an optical scanning device for scanning an information layer of an optical record carrier, the information layer being covered by a transparent layer of thickness $t_d$ and refractive index $n_d$, the method comprising the steps of: providing a radiation source for generating a radiation beam; providing a lens system for converging the radiation beam on the information layer, the lens system being characterized in comprising a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where D is the entrance pupil diameter, FWD is the free working distance, and D, FWD, t and $t_d$ are expressed in millimeters and where $FWD + t_d/n_d < 0.51$.

Other aspects of the invention will be apparent from the dependent claims.

Figure 2:
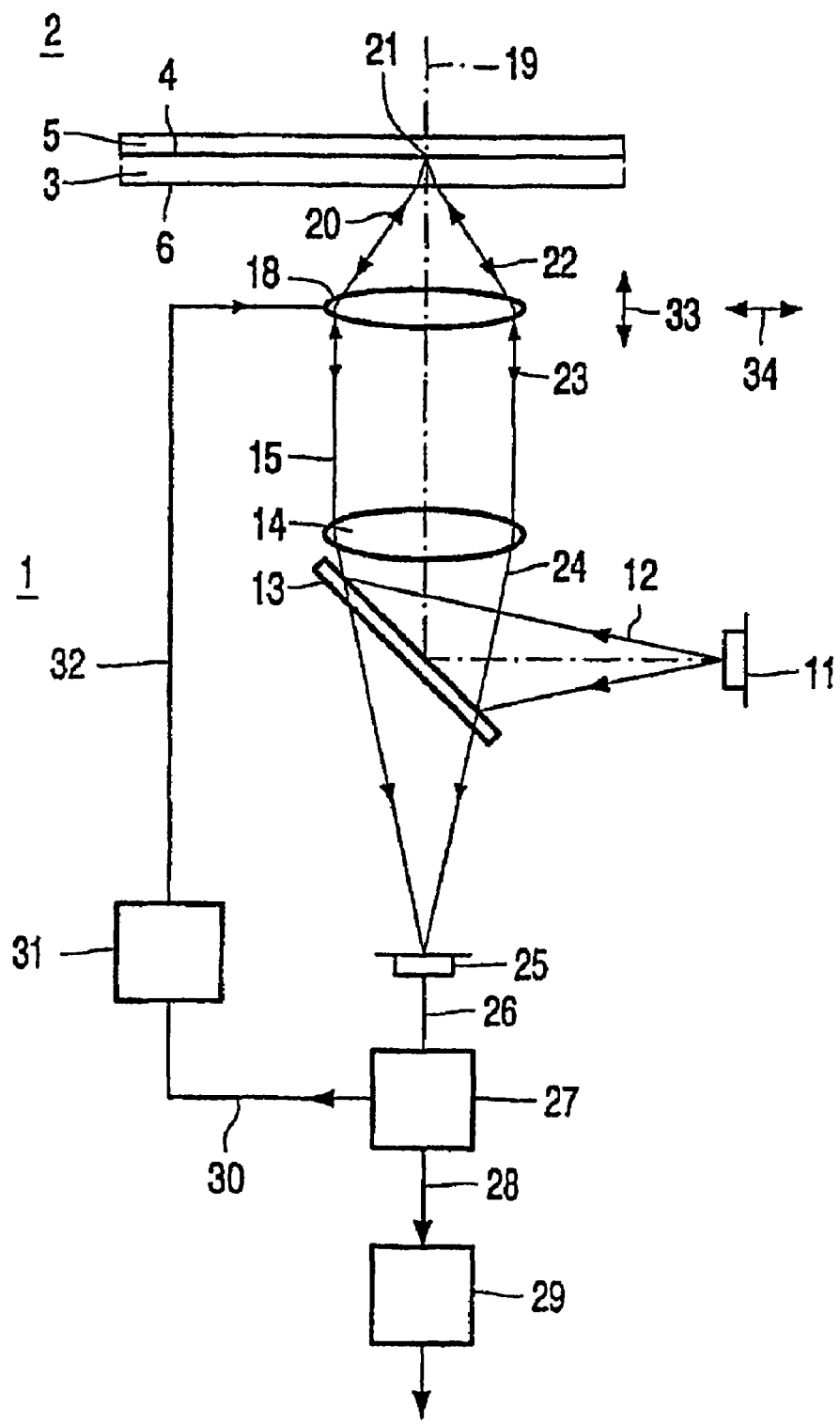
Figure 3:
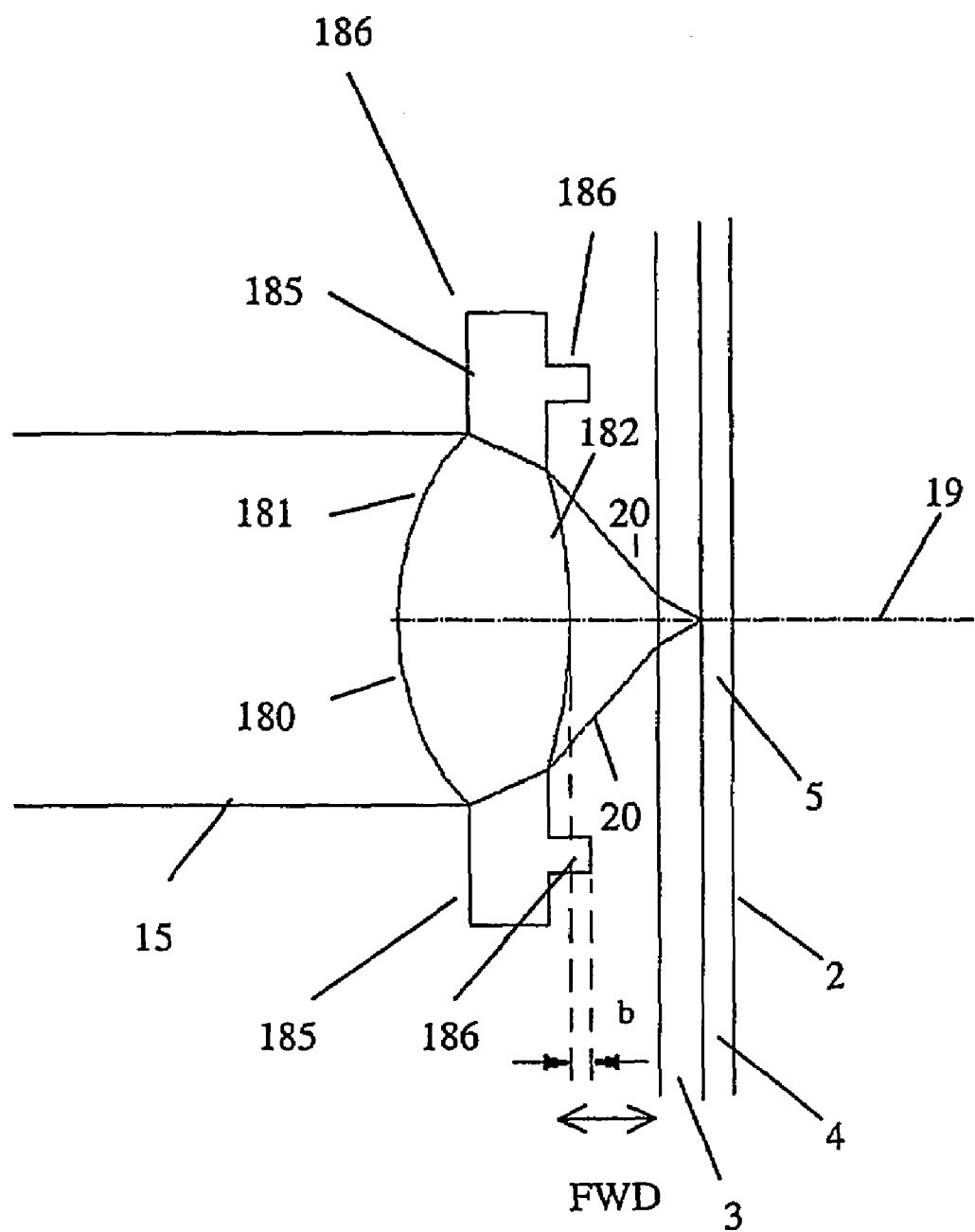

For a better understanding of the invention, and to show how embodiments of the same may be carried into effect, reference will now be made, by way of example, to the accompanying diagrammatic drawings in which:

FIGS. 1A, 1B, 1C and 1D show a lens having two aspherical surfaces, with one of the surfaces being respectively: in the desired position, too far away from the second surface, decentred with respect to the second surface, and tilted with respect to the second surface;

FIG. 2 shows a device for scanning an optical record carrier including an objective system in accordance with an embodiment of the present invention;

FIG. 3 shows a close up of the lens 18 from FIG. 2; and

Figure 4A:
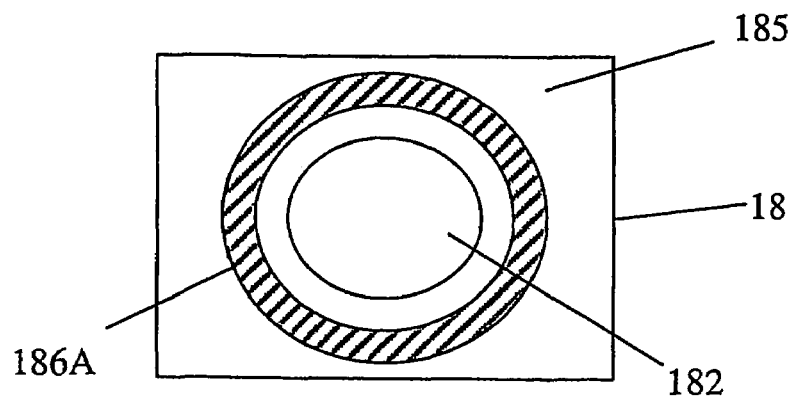
Figure 4B:
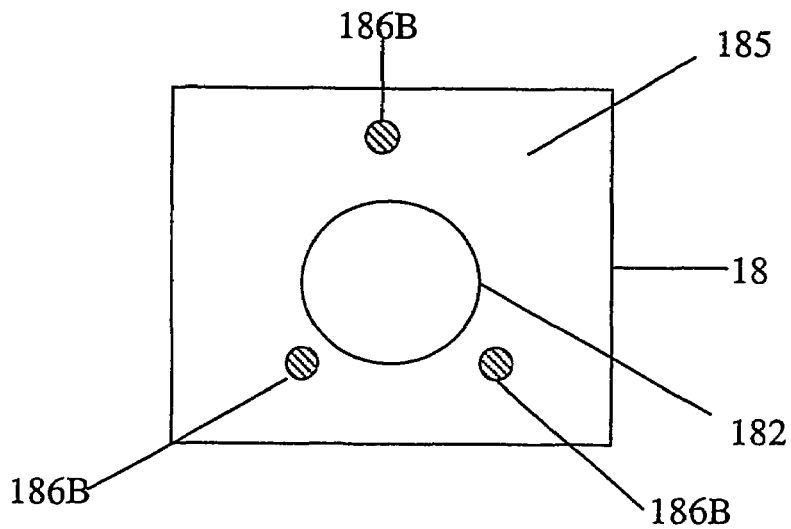
Figure 4C:
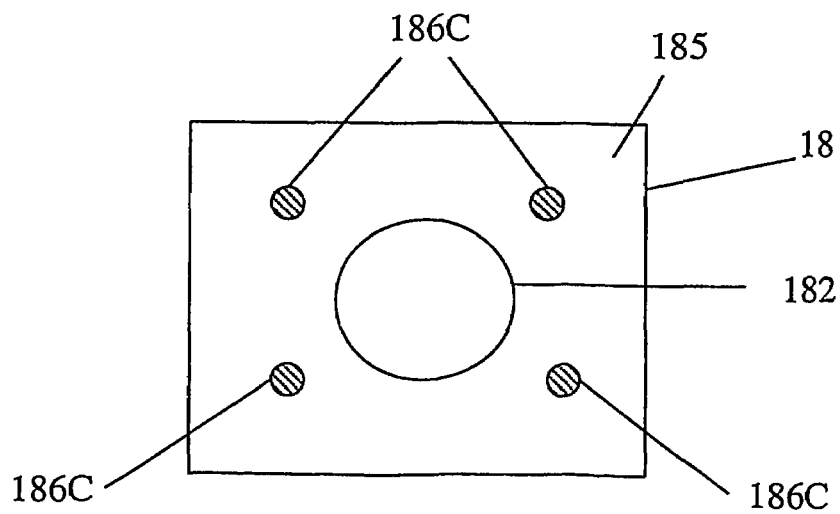

FIGS. 4A, 4B and 4C show respective lenses with differing designs of protection devices in accordance with embodiments of the present invention.

FIG. 2 shows a device 1 for scanning an optical record carrier 2, including an objective lens 18 according to an embodiment of the present invention. The record carrier comprises a transparent layer 3, on one side of which an information layer 4 is arranged. The side of the information layer facing away from the transparent layer is protected from environmental influences by a protection layer 5. The side of the transparent layer facing the device is called the entrance face 6. The transparent layer 3 acts as a substrate for the record carrier by providing mechanical support for the information layer.

Alternatively, the transparent layer may have the sole function of protecting the information layer, while the mechanical support is provided by a layer on the other side of the information layer, for instance by the protection layer 5 or by a further information layer and a transparent layer connected to the information layer 4. Information may be stored in the information layer 4 of the record carrier in the form of optically detectable marks arranged in substantially parallel, concentric or spiral tracks, not indicated in the Figure. The marks may be in any optically readable form, e.g. in the form of pits, or areas with a reflection coefficient or a direction of magnetization different from their surroundings, or a combination of these forms.

The scanning device 1 comprises a radiation source 11 that can emit a radiation beam 12. The radiation source may be a semiconductor laser. A beam splitter 13 reflects the diverging radiation beam 12 towards a collimator lens 14, which converts the diverging beam 12 into a collimated beam 15. The collimated beam 15 is incident on an objective system 18.

The objective system may comprise one or more lenses and/or a grating. The objective system 18 has an optical axis 19. The objective system 18 changes the beam 17 to a converging beam 20, incident on the entrance face 6 of the record carrier 2. The objective system has a spherical aberration correction adapted for passage of the radiation beam through the thickness of the transparent layer 3. The converging beam 20 forms a spot 21 on the information layer 4. Radiation reflected by the information layer 4 forms a diverging beam 22, transformed into a substantially collimated beam 23 by the objective system 18 and subsequently into a converging beam 24 by the collimator lens 14. The beam splitter 13 separates the forward and reflected beams by transmitting at least part of the converging beam 24 towards a detection system 25. The detection system captures the radiation and converts it into electrical output signals 26. A signal processor 27 converts these output signals to various other signals.

One of the signals is an information signal 28, the value of which represents information read from the information layer 4. The information signal is processed by an information processing unit for error correction 29. Other signals from the signal processor 27 are the focus error signal and radial error signal 30. The focus error signal represents the axial difference in height between the spot 21 and the information layer 4. The radial error signal represents the distance in the plane of the information layer 4 between the spot 21 and the centre of a track in the information layer to be followed by the spot.

The focus error signal and the radial error signal are fed into a servo circuit 31, which converts these signals to servo control signals 32 for controlling a focus actuator and a radial actuator respectively. The actuators are not shown in the Figure. The focus actuator controls the position of the objective system 18 in the focus direction 33, thereby controlling the actual position of the spot 21 such that it coincides substantially with the plane of the information layer 4. The radial actuator controls the position of the objective lens 18 in a radial direction 34, thereby controlling the radial position of the spot 21 such that it coincides substantially with the central line of track to be followed in the information layer 4. The tracks in the Figure run in a direction perpendicular to the plane of the Figure.

The device of FIG. 2 may be adapted to scan also a second type of record carrier having a thicker transparent layer than the record carrier 2. The device may use the radiation beam 12 or a radiation beam having a different wavelength for scanning the record carrier of the second type. The NA of this radiation beam may be adapted to the type of record carrier. The spherical aberration compensation of the objective system must be adapted accordingly.

In order to provide a small objective lens capable of being produced with reasonable manufacturing tolerances, we propose an objective lens formed of a single material, such as plastic. Suitable plastics include COC (cyclo olefinic copolymer), PMMA (poly(methyl methacrylate)) and polycarbonate. Such a lens can be made using a plastic moulding process. Preferably, the single material has a relatively high refractive index, and preferably the lens is a single element lens formed with at least one aspherical surface.

In order to prevent the lens 18, contacting the surface of the optical record carrier 2, embodiments of the present invention utilize a lens protection device. FIG. 3 illustrates a close-up of the lens 18 shown as the objective system in FIG. 2, with the lens having such a lens protection device (186).

FIG. 3 shows the lens 18 positioned adjacent to the optical record carrier 2, with the lens 18 acting to converge an incoming radiation beam 15 onto the information layer 4 of the record carrier 2, through the transparent layer 3.

The lens 18 has a first aspherical surface 181 facing the radiation beam source, and a second aspherical surface 182 facing the optical record carrier 2. These surfaces 181, 182 forming the converging portion 180 of the lens 18. Surrounding this converging portion is a lens body 185. On the lens body, protruding from the surface of the lens body facing the optical record carrier, is a protection device 186. In this instance, the device 186 takes the form of an annular ring surrounding the lens surface 182 (as will be described below with reference to FIG. 4A).

The lens 18 is positioned at a free working distance (FWD) away from the surface of the record carrier. This is the distance along the optical axis 19 between the lens surface 182 and the outer surface of the optical record carrier (i.e. the external surface of the transparent layer 3).

In order to prevent the lens surface 182 being able to contact the optical record carrier 2, the protection device extends further from the body of the lens than the surface 182 by a distance b.

The ratio b/FWD should preferably comply with
b/FWD>0.05,
More preferably,
b/FWD>0.1,
while even more preferably,
b/FWD>0.25.

FIGS. 4A, 4B, and 4C show different implementations of the protection device 186 (the different implementations being labeled respectively 186A, 186B and 186C).

In FIG. 4A, the protection device comprises a ring 186A surrounding the second surface 182 of the lens 18 (the second surface 182 is taken as the portion of the lens facing the optical record carrier 2, utilized to converge the radiation beam).

It will be appreciated that the protection device can of course take many other forms, as long as the protection device is arranged to project away from the body of the lens 18 a greater distance towards the record carrier 2 than the surface 182. For instance, FIG. 4B shows three separate projections 186B surrounding the surface 182, whilst FIG. 4C shows four separate projections 186C.

The protection device (or "bumper") can be formed of one or more materials, including plastic or glass. The device can be formed of a resilient material. In the preferred embodiment, the protection device is formed of the same material as the lens. Preferably, the device is formed as an integral part of the lens, although it could be formed as a separate unit and subsequently mounted on the lens. For instance, the lens including the bumper could be formed as a single unit using plastic injection moulding.

In order to be able to provide an objective lens with a numerical aperture (NA)>0.65, and an entrance pupil diameter smaller than 2 mm which is tolerant for field, thickness differences, decenter and tilt of the two aspherical surfaces, we have found that it is desirable that the thickness t of the objective lens (the thickness of the lens along the optical axis) should comply with the relationship:

$$0.8 < \frac{t - 1.1D + 1.1}{1.18 - 2.28\left[FWD + \frac{t_d}{n_d}\right]} < 1.2 \quad (1)$$

where D is the entrance pupil diameter, FWD is the free working distance, and D, FWD, t and $t_d$ are all expressed in mm and where $FWD + t_d/n_d < 0.51$.

The free working distance corresponds to the distance the lens can be moved before contacting the record carrier if the bumper was not present i.e. the distance from the surface of the lens facing the record carrier to the surface of the transparent layer 3, as measured along the optical axis.

More preferably, the thickness of the lens complies with the relationship:

$$0.9 < \frac{t - 1.1D + 1.1}{1.18 - 2.28\left[FWD + \frac{t_d}{n_d}\right]} < 1.1 \quad (2)$$

where $FWD + t_d/n_d < 0.51$.

In use in a scanning device, the lens might be used in combination with different wavelengths of radiation (different wavelengths may be used to read and write data). Alternatively the wavelength of the radiation source (e.g. a laser) may change as a function of the power of the radiation beam (different powers may be utilized to read and write data to an information recording medium). In order that the lens is tolerant to such variations in wavelength, it is preferable that the Abbe number of the lens material (e.g. glass) is greater that 40.

In table I three explicit embodiments are tabulated.

The front and back surfaces of the lenses each have a rotational symmetric aspherical shape which is given by the equation:

$$z(r) = \frac{cr^2}{1 + \sqrt{1 - c^2 r^2}} + \sum_{i=1}^{8} B_{2i}\left(\frac{r}{r_0}\right)^{2i}$$

with z the position of the surface in the direction of the optical axis in millimeters, r the distance to the optical axis in millimeters, c the curvature of the surface, $r_0$ is the normalization radius in millimeters, and $B_k$ the coefficient of the k-th power of r. The values of $B_k$ for three different example lens designs are listed in table I, in which the $1^{st}$ asphere is assumed to be the surface of the lens facing the radiation source and the $2^{nd}$ asphere is assumed to be the surface of the lens facing the disc.

TABLE I

|  | Example | | |
| --- | --- | --- | --- |
|  | A | B | C |
| Entrance pupil diameter (mm) | 1.0 | 0.8 | 0.6 |
| lens material | COC | COC | COC |
| Refractive Index n lens | 1.5499 | 1.5499 | 1.5499 |
| Abbe number lens | 56.2 | 56.2 | 56.2 |
| Numerical aperture | 0.85 | 0.85 | 0.85 |
| Wavelength (nm) | 405 | 405 | 405 |
| Cover layer thickness $t_d$ disc (mm) | 0.1 | 0.1 | 0.1 |
| Refractive index $n_d$ disc | 1.6223 | 1.6223 | 1.6223 |
| Free working distance FWD (mm) | 0.075 | 0.075 | 0.075 |
| Thickness t lens (mm) | 0.940654 | 0.675536 | 0.426313 |
| Asphere 1 | | | |
| Curvature c (mm$^{-1}$) | 0 | 0 | 0 |
| Normalization radius $r_0$ (mm) | 1.0 | 1.0 | 1.0 |
| $B_2$ (mm$^{-2}$) | 1.165461 | 1.507597 | 2.103488 |
| $B_4$ (mm$^{-4}$) | 0.818350 | 1.702514 | 4.522328 |
| $B_6$ (mm$^{-6}$) | 3.025320 | 10.143725 | 43.026256 |
| $B_8$ (mm$^{-8}$) | −35.706588 | −178.569261 | −1121.86005 |
| $B_{10}$ (mm$^{-10}$) | 436.024490 | 3181.469900 | 34692.806300 |
| $B_{12}$ (mm$^{-12}$) | −2963.305610 | −29616.835700 | −520189.59800 |
| $B_{14}$ (mm$^{-14}$) | 10443.7314 | 141324.581000 | 3897662.00000 |
| $B_{16}$ (mm$^{-16}$) | −14642.692300 | −278297.24800 | −12269119.000 |
| Asphere 2 | | | |
| Curvature c (mm$^{-1}$) | −2.834025 | −2.451714 | −1.752207 |
| Normalization radius $r_0$ (mm) | 0.5 | 0.5 | 0.5 |
| $B_2$ (mm$^{-2}$) | 0 | 0 | 0 |
| $B_4$ (mm$^{-4}$) | 4.238381 | 2.954558 | 1.488126 |
| $B_6$ (mm$^{-6}$) | −62.224528 | −30.333006 | −3.599235 |
| $B_8$ (mm$^{-8}$) | 722.784569 | 235.863437 | −135.561112 |
| $B_{10}$ (mm$^{-10}$) | −5315.187460 | −1135.953810 | 2173.230260 |
| $B_{12}$ (mm$^{-12}$) | 23238.250800 | 2916.766300 | −15061.531400 |
| $B_{14}$ (mm$^{-14}$) | −55085.290200 | −2610.629660 | 51549.036000 |
| $B_{16}$ (mm$^{-16}$) | 54502.120900 | −1558.081070 | −70779.446200 |

Let the parameter Q be defined by $$Q = \frac{t - 1.1D + 1.1}{1.18 - 2.28\left[FWD + \frac{t_d}{n_d}\right]}$$

Various objective lens designs were considered with numerical aperture NA=0.85, utilizing a radiation beam of wavelength 405 nm, with a disc (optical recording medium) having a cover layer thickness of $t_d$=0.1 mm and refractive index of $n_d$=1.6223. In table II the parameter Q is calculated for these various objective lens designs, including the three above explicit designs (A, B, C) tabulated in table I. The designs are optimized to be tolerant for oblique entrance (field), decentre of the aspherical surfaces, tilt of the aspherical surfaces and variations in thickness of the objective lens.

TABLE II

| Example # | Entrance pupil diameter D (mm) | Free working distance FWD (mm) | Q |
|---|---|---|---|
| 1 (A) | 1.0 | 0.075 | 1.08 |
| 2 | 0.9 | 0.075 | 1.06 |
| 3 (B) | 0.8 | 0.075 | 1.04 |
| 4 | 0.7 | 0.075 | 1.01 |
| 5 (C) | 0.6 | 0.075 | 1.00 |
| 6 | 0.5 | 0.075 | 0.99 |
| 7 | 1.0 | 0.150 | 1.12 |
| 8 | 0.9 | 0.150 | 1.10 |
| 9 | 0.8 | 0.150 | 1.10 |
| 10 | 0.7 | 0.150 | 1.10 |
| 11 | 0.6 | 0.150 | 1.09 |

From Table II we deduce that the parameter Q should comply with the relation
0.8<Q<1.2
or more preferably
0.9<Q<1.1.

It will be appreciated that different embodiments of the invention can be applied in relation to a variety of lens systems. Preferably, embodiments are utilized in respect of lens systems that have a numerical aperture of greater than 0.7. Preferably, lens systems in accordance with embodiments have an entrance pupil diameter of less than 2 mm, and even more preferably, less than 1.5 mm. Preferably, embodiments are utilized in conjunction with radiation beams having a wavelength less than 600 nm, including beams having wave lengths of approximately 405 nm.

Whilst the above embodiments have been described in conjunction with lenses formed only of plastic (and normally formed by a plastic moulding process, such as injection moulding), it will be appreciated that the parameters of the present invention are appropriate for lens designs formed of any single material e.g. glass lenses (for instance, formed by glass moulding processes).

Within this description, details and design parameters have been provided for various objective lenses. It will be appreciated that an objective system could include such a lens, but is not limited to such a lens e.g. the system could also comprise a grating or other lenses. Further, whilst the lenses have been described as "objective lenses", such lenses are not limited to being utilized in objective systems, but could be used in any type of apparatus or system.

In view of the above examples, it will be appreciated that embodiments of the invention can be used to provide objective lenses formed from a single material capable of withstanding reasonable manufacturing tolerances. Further, embodiments of the present invention are tolerant to oblique beam entrance to the lens, and have a protection device (e.g. a "bumper") arranged to stop the lens contacting the surface of an optical recording medium.

The invention claimed is:

1. An optical scanning device (1) for scanning an information layer (4) of an optical record carrier (2), the device (1) comprising a radiation source (11) for generating a radiation beam (12, 15, 20) and an objective system (18) for converging the radiation beam on the information layer, the information layer being covered by a transparent layer (3) of thickness $t_d$ and refractive index $n_d$, the objective system being characterized in comprising a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where t is the thickness of the lens, D is the entrance pupil diameter, FWD is the free working distance, and D, FWD, t and $t_d$ are expressed in millimeters and where FWD+$t_d/n_d$<0.51.

2. A scanning device (1) as claimed in claim 1, wherein the lens satisfies the condition:

$$0.9 < \frac{t - 1.1D + 1.1}{1.18 - 2.28\left[FWD + \frac{t_d}{n_d}\right]} < 1.1$$

3. A scanning device (1) as claimed in claim 1, wherein the lens and the protection device are formed from the same material.

4. A scanning device (1) as claimed in claim 1, wherein the lens is formed of plastic.

5. A scanning device (1) as claimed in claim 1, wherein the Abbe number of the lens material is greater than 40.

6. A scanning device (1) as claimed in claim 1, the scanning device further comprising a detection system (25, 27) for converting radiation coming from the information layer to an information signal, and an information processing unit (29) for error correction of the information signal.

7. A lens system (18) comprising at least one lens for converging a radiation beam on an information layer (4) of an optical record carrier (2), the information layer (4) being covered by a transparent layer (3) of thickness $t_d$ and refractive index $n_d$, the lens system being characterized in comprising a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where t is the thickness of the lens, D is the entrance pupil diameter, FWD is the free working distance, and D, FWD, t and $t_d$ are expressed in millimeters and where FWD+$t_d$/$n_d$<0.51.

8. A method for manufacturing a lens system (18) comprising at least one lens for converging a radiation beam (15) on an information layer (4) of an optical record carrier (2), the information layer (4) being covered by a transparent layer (3) of thickness $t_d$ and refractive index $n_d$, the method comprising the step of:

forming a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where t is the thickness of the lens, D is the entrance pupil diameter, FWD is the free working distance, and D, FWD, t and $t_d$ are expressed in millimeters and where FWD+$t_d$/$n_d$<0.51.

9. A method as claimed in claim 8, wherein a plastic moulding process is utilized to form the lens.

10. A method as claimed in claim 8, wherein a single plastic injection moulding process is utilized to form both the lens and the protection device.

11. A method of manufacturing an optical scanning device (1) for scanning an information layer (4) of an optical record carrier (2), the information layer (4) being covered by a transparent layer (3) of thickness $t_d$ and refractive index $n_d$, the method comprising the steps of:

providing a radiation source (11) for generating a radiation beam;

providing a lens system (18) for converging the radiation beam on the information layer (4), the lens system (18) being characterized in comprising a lens having a protection device projecting away from the lens towards the optical record carrier such that in use the distance between the protection device and the optical record carrier is less than the free working distance, the lens satisfying the condition:

$$0.8 < \frac{t - 1.1D + 1.1}{1.18 - 2.28\left[FWD + \frac{t_d}{n_d}\right]} < 1.2$$

where t is the thickness of the lens, D is the entrance pupil diameter, FWD is the free working distance, and D, FWD, t and $t_d$ are expressed in millimeters and where FWD+$t_d$/$n_d$<0.51.

* * * * *